(12) United States Patent
Stefano

(10) Patent No.: US 7,226,062 B1
(45) Date of Patent: Jun. 5, 2007

(54) RECREATIONAL WHEELIE VEHICLE

(76) Inventor: Nick Stefano, C-8 Deibert Dr., Stroudsburg, PA (US) 18360

( * ) Notice: Subject to any disclaimer, the term of this patent is extended or adjusted under 35 U.S.C. 154(b) by 138 days.

(21) Appl. No.: 10/693,675

(22) Filed: Oct. 24, 2003

(51) Int. Cl.
*A63C 17/02* (2006.01)

(52) U.S. Cl. ............ 280/87.041; 280/263; 280/87.042

(58) Field of Classification Search ............ 280/87.01, 280/87.041, 87.042, 87.021, 47.17, 263
See application file for complete search history.

(56) References Cited

U.S. PATENT DOCUMENTS

| | | | | |
|---|---|---|---|---|
| 210,435 | A * | 12/1878 | Root ........................... | 280/210 |
| 887,812 | A * | 5/1908 | Johnson ...................... | 280/220 |
| 1,056,357 | A * | 3/1913 | Murdock ............... | 280/87.042 |
| 1,128,810 | A * | 2/1915 | Martin ................... | 280/87.021 |
| 1,289,361 | A * | 12/1918 | Bastman ................ | 280/87.041 |
| 1,387,091 | A * | 8/1921 | Woolley, Jr. et al. ... | 280/87.042 |
| 1,467,453 | A * | 9/1923 | Edmond ........................ | 16/21 |
| D175,262 | S * | 8/1955 | Kousens ....................... | D34/17 |
| 2,726,845 | A * | 12/1955 | Hyslop, Jr. et al. ......... | 254/131 |
| 2,825,575 | A * | 3/1958 | Mickels ................ | 280/87.042 |
| 3,109,667 | A * | 11/1963 | Wolner .................. | 280/87.021 |
| 3,399,904 | A * | 9/1968 | Schinke ................. | 280/87.042 |
| 3,438,642 | A * | 4/1969 | Puleo et al. .................... | 280/8 |
| D214,575 | S * | 7/1969 | Fravel ........................ | D21/423 |
| 3,567,242 | A * | 3/1971 | Miller .................... | 280/87.041 |
| 4,073,500 | A * | 2/1978 | Campeau ............... | 280/87.041 |
| 4,133,548 | A * | 1/1979 | Smith ..................... | 280/87.041 |
| 4,279,043 | A * | 7/1981 | Saunders ................. | 5/81.1 RP |
| 4,526,390 | A * | 7/1985 | Skolnik ................. | 280/87.041 |
| 4,732,400 | A * | 3/1988 | Santini .................. | 280/87.042 |
| 4,776,604 | A * | 10/1988 | Valdez et al. .......... | 280/87.041 |
| D302,063 | S * | 7/1989 | Frazier et al. ............... | D34/17 |
| 4,941,670 | A * | 7/1990 | Parr ...................... | 280/87.021 |
| 5,029,887 | A * | 7/1991 | Grutzner et al. ......... | 280/242.1 |
| 5,046,747 | A * | 9/1991 | Nielsen, Jr. .............. | 280/11.28 |
| 5,062,630 | A * | 11/1991 | Nelson ........................ | 482/34 |
| 5,165,711 | A * | 11/1992 | Tsai ...................... | 280/87.041 |
| 6,158,453 | A * | 12/2000 | Nasco .......................... | 135/85 |
| 6,511,083 | B1 * | 1/2003 | Tsai ...................... | 280/87.041 |
| 6,561,534 | B2 * | 5/2003 | Gu .......................... | 280/242.1 |

* cited by examiner

*Primary Examiner*—Christopher P. Ellis
*Assistant Examiner*—Bridget Avery
(74) *Attorney, Agent, or Firm*—Charles A. Wilkinson; Clinton A. Wilkinson

(57) ABSTRACT

An amusement-type vehicle is provided particularly for doing so-called wheelies having a short wheel base upon a platform-type base with at least two side by side wheels forwardly and one wheel rearwardly upon which wheelies are performed and having a central handle by which the vehicle may be controlled.

11 Claims, 9 Drawing Sheets

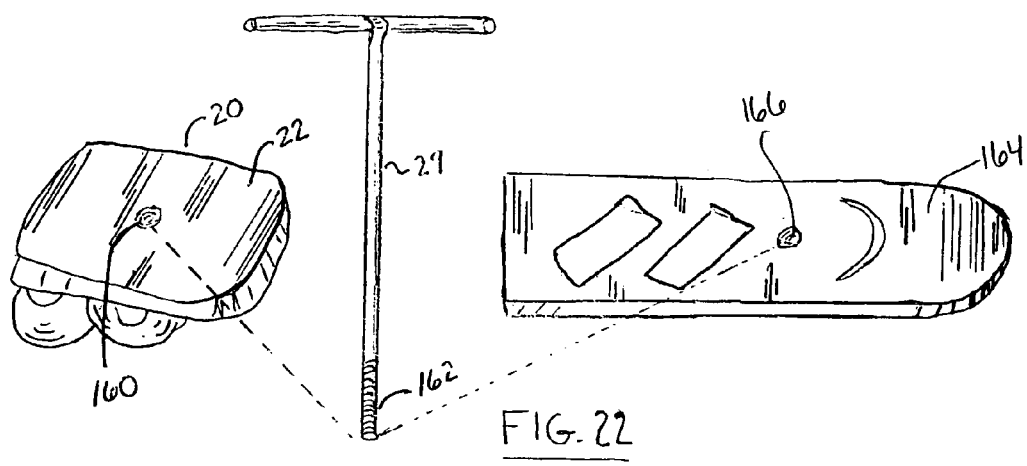
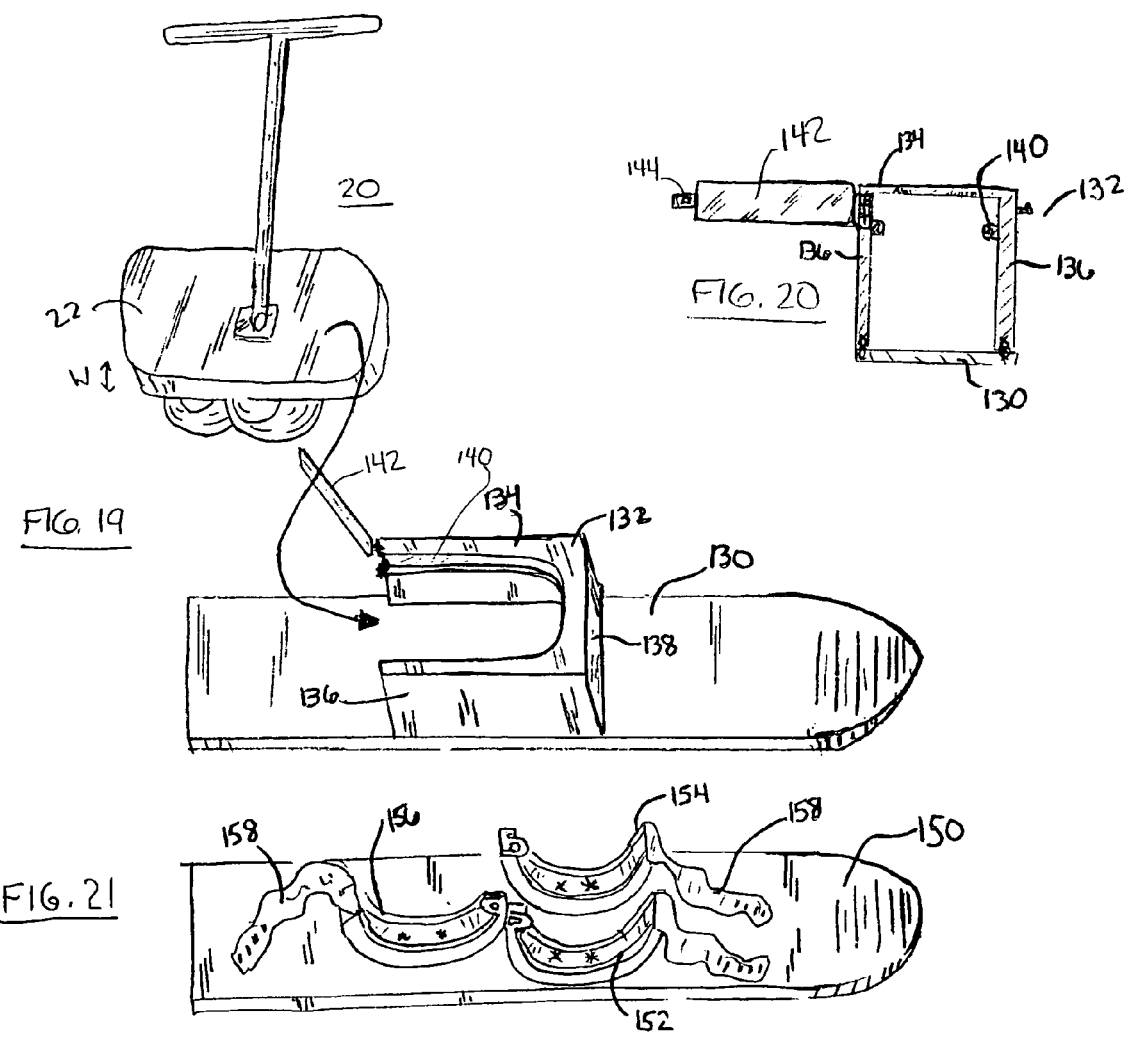

RECREATIONAL WHEELIE VEHICLE

BACKGROUND OF THE INVENTION

1. Field of the Invention

The present invention relates to both manually or rider propelled and motorized or self-propelled recreational vehicles for use primarily by children and other young at heart persons, and more particularly to recreational vehicles capable of performing a wheelie maneuver or stunt.

2. Preliminary Discussion

Balancing a vehicle momentarily on a single wheel with the other wheel or wheels held off of the ground, thus performing a so-called "wheelie," is an old and well-known maneuver, or stunt, most often performed on a bicycle or motorcycle. To perform a wheelie on a bicycle, the rider pedals along at a comfortable pace, leans forward so that his or her body weight is removed from the seat and held more or less over the handlebars, and then pedals a half stroke while sitting down in essentially the same movement, without stopping pedaling. This causes the front wheel of the bicycle to lift off of the ground, with the rider balancing on the rear wheel. Performing such stunt on a bicycle requires practice and balance, and once mastered may be combined with hopping or other stunts. In addition to performance on bicycles and motorcycles, wheelies are also routinely performed on skateboards, wherein by shift of the rider's weight the front two wheels are lifted off of the ground and the rider is balanced on the two rear wheels. A skid plate on the bottom side of the rear of the skateboard is also usually provided, which may also be used as a braking means by skilled riders.

While it is possible for riders to learn to perform wheelie maneuvers on a motorcycle or bicycle, and while, as illustrated below, there are known a number of auxiliary support wheels for attachment to cycles or scooters to enable one to hold a basic wheelie position longer and more easily, there are few if any vehicles known that are designed principally to perform wheelies. In fact, most attention is paid to engineering a wheeled vehicle that is difficult to raise on to a single wheel, since in most cases the intended rider desires to maintain his or her balance on the vehicle rather than to perform wheelie maneuvers or stunts. For example, most such vehicles have a long wheel base, and the handle bars are located above the front wheel so that the majority of the riders weight is centered near the middle of the vehicle, increasing its overall stability.

3. Description of Related Art

The following prior art patents related to recreational or amusement-type vehicles incorporating concepts related to the present invention are known by the inventor. None of these references teaches a recreational or amusement vehicle assembly as conceived by the present inventor whereby a riding vehicle specifically designed to perform wheelie-type stunts or maneuvers is disclosed.

U.S. Pat. No. 1,585,258 issued to A. Moore on May 18, 1926 entitled "Pole Monocycle" discloses a monocycle having a standing platform extending over both sides of a bicycle-type wheel and supported on a yoke. An upwardly extending pole having a handle bar on its upper end is mounted to the yoke, so that a rider may stand on the platform with the wheel positioned between his or her lower legs and with the handlebars directly in front of his or her body. The Moore monocycle is propelled by a ratchet wheel mechanism operated by rocking the handle back and forth. When the handlebar is rocked forwardly, the ratchet engages and turns the wheel forwardly and when the handle is rocked rearwardly the ratchet is not engaged. Simultaneously as the handlebar is rocked forwardly it is stated the footrest is raised slightly, and when the handle bar is rocked rearwardly, the footrest is lowered slightly which movement may be attractive to users. The device may also be propelled by the foot of the user on the ground, or simply by jumping forwardly on to the standing platform and the rider's momentum causing the wheel to roll. While the Moore reference broadly discloses a wheeled vehicle having a standing platform and an upwardly extending handle, such vehicle is not capable of performing a wheelie stunt as it only has one wheel.

U.S. Pat. No. 1,652,934 issued to P. E. Gillespie on Dec. 13, 1927, entitled "Toy," discloses another single-wheeled vehicle having a yoke attached to the wheel axle. A single footrest or stirrup is attached on one side of the vehicle, while an upwardly extending handle is connected above the wheel to the yoke. The vehicle is manually propelled by placing one foot on the ground and pushing forwardly while the other foot is placed in the stirrup. Such vehicle also has a single wheel and therefore is incapable of performing a "wheelie."

U.S. Pat. No. 1,697,994 issued to J. C. Moore, Jr. on Jan. 8, 1929, entitled "Coaster," discloses a vehicle having a pair of axially aligned wheels and having a foot pedal similar to a conventional bicycle pedal positioned between the wheels, as well as an upwardly extending handle. The coaster is propelled with one foot on the pedal and the other foot pushing generally forwardly against the ground. While the use of two wheels on opposite sides of the pedal makes the Moore coaster more stable and laterally balanced, and the balancing effort of the rider is thus forward and rearwardly aided by free rotation of the single step pedal, the device is not designed to perform a wheelie as the wheels are in parallel.

U.S. Pat. No. 2,971,773 issued to C. C. McKissick on Feb. 14, 1961, entitled "Pogo Monocycles," discloses another single wheeled vehicle having pedals or footrests on either side of such wheel, as well as an upwardly extending height adjustable handlebar. McKissick also discloses a rearwardly extending braking mechanism.

U.S. Pat. No. 3,512,798 issued to S. Siegel on May 19, 1970, entitled "Skate Board Device," discloses an amusement device comprised of a wing-shaped standing platform having a central hole in which a proportionately large spherical member is mounted on an axle, while four smaller stabilizing wheels or balls are provided spaced on the underside of the device, which wheels are elevated from the ground slightly. In use, when a certain speed or balance is attained, a user standing or balanced on the platform will be propelled forward with only the large sphere, or ball, touching the ground.

U.S. Pat. No. 3,734,535 issued to D. M. Sidlauskas on May 22, 1973, entitled "Tricycle Having Driving Energy Storing Arrangement," discloses a tricycle designed to perform a wheelie having a pair of large rear wheels and a smaller steerable front wheel. Coil springs connected to the rear wheel axle are wound on the axle and store up driving energy as the bike is pedaled and moves forward. Pulling back on the handle bars releases the springs, causing a forward energy to be transmitted to the rear wheels. The springs are used to help propel the vehicle forwardly fast enough so that the front wheel is easily lifted off the ground to perform a wheelie stunt. Also provided along the rear side of the seat is a leaf spring having a small wheel on the end of the spring that contacts the ground surface when the wheelie is performed. Sidlauskas discloses a manually powered tricycle specifically designed to do wheelies. However, the tricycle has a completely different structure from the present inventor's vehicle.

U.S. Pat. No. 4,095,817 issued to D. R. Cohen on Jun. 20, 1978, entitled "Wheelie Skateboard," discloses a skateboard having a regular set of wheels and in addition having a third set of wheels on the upwardly angled rear or tail section so that the board may be flipped into a wheelie maneuver and balanced on the rear wheels and third set of wheels. Cohen therefore teaches a device that enables one to maintain a wheelie position more easily, but in the process actually prevents a real or traditional wheelie from being performed, because the skateboard is still balanced on two pairs of axially aligned wheels.

U.S. Pat. No. 4,106,786 issued to E. R. Talbott on Aug. 15, 1978, entitled "Recreational Vehicle For Use On Sloping Terrains," discloses a circular platform having a large single central wheel and a handle at the front. A rider shifts their weight in riding the device including scraping rear runners on the ground as a braking means, but does not perform wheelies.

U.S. Pat. No. 4,526,390 issued to A. M. Skolnik on Jul. 2, 1985, entitled "Toy Vehicle," discloses a three-wheeled vehicle having a triangular wheelbase and pyramid-shaped frame formed of tubular members and having a steering fork with handle bars connected to the front wheel. A standing platform is provided between the spaced apart rear wheels. Such vehicle is arranged so that the handlebar is generally close to the axis of the rear wheels, making it easier for a rider to tilt the vehicle rearwardly on to the rear wheels and then balance in such position, thereby performing a wheelie maneuver. Structurally, the Skolnik scooter is different from the present inventor's vehicle in several respects, such as that the wheels are not all mounted to the same platform.

U.S. Pat. No. 4,707,884 issued to S. T. Chang on Nov. 24, 1987, entitled "Foldable Handle for a Skateboard," discloses a skateboard having an upwardly extending foldable handle, making it more similar to a scooter and making it easier to maintain one's balance when riding the skateboard. Of course, skateboards are typically used to perform wheelies wherein the two front wheels are raised off the ground. However, the arrangement other for the use of a handle is not dissimilar to the usual skateboard arrangement.

U.S. Pat. No. 4,795,181 issued to R. B. Armstrong on Jan. 3, 1989, entitled "Skateboard," discloses a modified skateboard having a V-shaped board, a large centrally-located wheel, and pairs of front and rear wheels. The skateboard is arranged so that the central wheel is in contact with the ground when either the front or rear wheels are in contact with the ground, but when the front wheels are in contact with the ground, the rear wheels are off the ground. It is also possible for the center wheel to be the only wheel touching the ground. A brake assembly is also optionally connected to the center wheel. The Armstrong skateboard is therefore technically capable of riding on a single wheel wherein the front and rear wheels are lifted off of the ground at the same time. However, such position would not be considered a conventional wheelie position.

U.S. Pat. No. 4,842,091 issued to W. J. Badsey on Jun. 27, 1989, entitled "Two-Wheeled Recreational Motor Vehicle," discloses a two-wheeled self-propelled vehicle having a handle bar with brakes and a platform on which the user stands when operating the vehicle. The wheels are wide so that the device is generally stable enough for a rider to stand on the platform without tipping when the vehicle is not in use. In addition, the balance of the vehicle is also such that a rider standing on the platform may shift his or her weight back to rear lip to perform wheelies.

U.S. Pat. No. 5,154,436 issued to M. J. Jez et al. on Oct. 13, 1992, entitled "Wheeled Riding Apparatus," discloses a hybrid scooter/skateboard apparatus having an upwardly extending handle, a flexible board supported by a leaf spring, and an upwardly curved rear tail section of the type found on most skateboards and usually intended to provide an area for the user to press downwardly on with his or her foot to perform a wheelie. The Jez et al. vehicle is apparently meant to be operated with all four wheels on the ground, however.

U.S. Pat. No. 5,765,871 issued to D. Wyman et al. on Jun. 16, 1998, entitled "Children's Riding Toys," discloses a Big Wheel® type tricycle having a fourth wheel connected centrally behind the standard rear wheel axle of the tricycle. The fourth wheel is provided and angled so that when the rider tips the front wheel upwardly, a wheelie maneuver is performed balancing on the rear wheels and the auxiliary fourth wheel. Wyman et al. is another example of an invention meant to make performing a wheelie type stunt easier, although by doing so eliminates the skill required to maintain one's balance in a wheelie position, not to mention the fun and satisfaction resulting from performing and maintaining a wheelie without such fourth auxiliary wheel attachment.

U.S. Pat. No. 6,220,612 issued to J. G. Beleski, Jr. on Apr. 24, 2001, entitled "Cambering Vehicle and Mechanism," discloses a manually propelled vehicle having a front wheel connected to a foldable handlebar, as well as to a pair of rearwardly extending arms having similarly sized wheels on their ends comprising the rear wheels of the three-wheeled vehicle. Footrest platforms are provided directly above each of the rear wheels. The Beleski vehicle is a "cambering" type vehicle wherein generally forward movement of the vehicle is provided by shifting of one's weight from side to side on the vehicle so that the vehicle travels in a sinusoidal path. Beleski does not indicate that the vehicle is properly balanced to perform wheelie maneuvers.

U.S. Pat. No. 6,367,828 issued to L. Mandic on Apr. 9, 2002, entitled "Recreational Board Vehicle," discloses another skateboard or scooter type vehicle having an upwarding extending handlebar. A brake assembly is also provided, as is a wheelie assembly on the rear end of the board so that rather than skidding on the bottom of the board as with a regular skateboard, the board may be balanced on the rear wheels and the wheelie wheels.

U.S. Pat. No. 6,386,562 issued to H. S. Kuo on May 14, 2002, entitled "Scooter Having Changeable Steering Mechanism," discloses a scooter having a single steerable front wheel connected to an adjustable handle, a front board, a pair of centrally located wheels, a rear board, and a single smaller rear wheel. The scooter platform is comprised of the front board extending between the front and center wheels, and the rear board extending between the center and rear wheels. The front and rear boards are slightly angled with respect to each other so that when the front and center wheels are touching the ground, the slightly smaller rear wheel is off the ground. This in effect allows the user to perform wheelie maneuvers, although strictly speaking not in the same manner as the traditional wheelie which performs a wheelie by temporary rearward balancing on rear wheels not designed for such maneuvers.

U.S. PAT. APP. PUB. NO. 2002/0030339 filed by R. H. Powers and published on Mar. 14, 2002, entitled "Scooter," discloses a two-wheeled scooter having a steerable front wheel, a handle bar, and a standing platform situated between the front and rear wheel assemblies. A brake pedal is provided on the rear of the platform to enable the user to better control the speed of the scooter, as well as to perform wheelie maneuvers.

U.S. PAT. APP. PUB. NO. 2002/0096849 filed by R. M. Bang and published on Jul. 25, 2002, entitled "Trick Bar For Foot Scooter," discloses a wheeled platform for connecting behind the rear wheel of a conventional two-wheeled scooter. The platform includes a foot bar and a pair of wheels and basically is designed to enable the user to perform wheelie-type movements on the scooter.

U.S. DES. Pat. D326,290 issued to W. J. Badsey on May 19, 1992, entitled "Motorized Scooter," discloses an ornamental design for a scooter the same or closely similar to the scooter discussed above with reference to Badsey's '091 utility patent.

U.S. DES. Pat. D444,184 issued to H. Kettler on Jun. 26, 2001, entitled "Scooter," discloses an ornamental design for a scooter having a steerable large front wheel and handlebars, and a platform with two small wheels extending rearwardly from the large front wheel on which the user stands.

While the prior art, therefore, has provided a large number of platform type wheeled vehicles or other wheeled vehicles of relatively small dimensions for various purposes, none has provided a short wheelbase platform-type vehicle having a single rear wheel or an effectively single rear wheeled vehicle having a handle for control of the vehicle both while riding and when dismounted or dismounting. By "effectively single wheeled" it is meant that there is only a single wheeled at the rear upon which wheelies are performed or alternatively there is a pair of ganged wheels mounted close together to in effect act as or in the place of a single rear wheel of a large diameter or more weight capacity. For example, a pair of ganged wheels may be mounted upon a short axle between axle mountings or mounted upon short separate axles mounted upon a single support similar to the ganged wheels customarily used by relatively large aircraft.

OBJECTS OF THE INVENTION

It is therefore a primary object of the invention to provide a wheeled platform type vehicle particularly adaptable to performing so called "wheelies" in which the vehicle is tipped back while traveling across a surface and balanced on a wheel or wheels.

It is a further object of the invention to provide a platform type vehicle for performing so called standing wheelies said platform type vehicle having a handle to aid in control of the platform both while performing wheelie maneuvers and also after dismounting.

It is a still further object of the invention to provide a platform type vehicle having a relatively short wheel base which not only minimizes the size and cost of the vehicle, but maximizes the skill necessary to control and perform wheelies, but also decreases the likelihood of either the rider or bystanders being injured during the performance of wheelies thereon.

It is a still further object of the invention to provide a platform type recreational vehicle typically having at least three wheels with the wheel or wheels upon which wheelies are performed being positioned at the rear of the platform, whereby skill in balancing not only in a forward and rear direction is necessary, but also skill in lateral balance is required.

It is a still further object of the invention to provide a relatively short wheelbase recreational vehicle having a small motor for effecting motion of such vehicle.

It is a still further object of the invention to provide a basic wheeled platform type vehicle that can be easily converted to other recreational type uses such as dry land wind sailing, skiboarding and the like.

Still other objects and advantages of the invention will become clear upon review of the following detailed description in conjunction with the appended drawings.

SUMMARY OF THE INVENTION

A short wheel base rider propelled platform is provided with at least three wheels preferably arranged in a triangle, two wheels forward and one to the rear, with a handle to provide maneuverability and controllability on the short wheel base. Wheelies are performed on the single rear wheel by pulling back on the handle and shifting the riders weight rearwardly while supported on the platform. No additional balance wheels are used except in a training mode and the single rear wheel upon which wheelies are performed retains the necessity for skill in performance which is the basic fascination in performing wheelies. The skill necessary is increased by the short wheel base, which, however, also increases the safety by enabling the user to easily step back from the platform onto the ground while retaining control with the handle when balance is lost. Various modifications and embodiments of the basic invention are possible as follows.

In one embodiment there is provided a manually or rider propelled amusement vehicle for carrying a standing person, the vehicle being particularly balanced and designed so it is capable of performing a wheelie maneuver. The vehicle of this embodiment includes a platform for supporting the user in a standing position. The platform is mounted on three ground-contacting wheel or spherical members on which the vehicle may freely move across a surface. The wheels are arranged preferably such that there is a center rear wheel and a pair of substantially coaxial or aligned second and third wheels situated forwardly and outwardly from the rear wheel. The rear edge of the platform extends rearwardly beyond the rear wheel axle. A handle having a hand grip member provided at its upper end is mounted extending upwardly from the platform, which hand grip member is grasped by the user when standing or riding on the platform. The vehicle is balanced such that by leaning rearwardly and pulling on the handle, the user can easily tilt the vehicle so that the second and third wheels are raised off the ground and the vehicle is riding only on the rear wheel.

In another embodiment, the handle is telescoping or otherwise adjustable in height, and may be mounted to the platform such that it can be tilted forward with respect to the position of the user on the platform, thereby providing adequate room on said platform for the user to comfortably stand. In this embodiment, the vehicle wheels may be aligned so that the vehicle is capable of moving in either a forward or rearward direction, but not sideways. The diameter of the center wheel may also be greater than the diameter of the second and third wheels.

In another embodiment, there is provided a fourth wheel located near the front end of the platform and preferably aligned with the rear wheel. The addition of such fourth wheel enables riders to perform a wheelie on to either the front or rear wheels of the vehicle.

In another embodiment, the vehicle is balanced so that a wheelie maneuver may be performed on to not only the front or rear wheels, but on to any of the wheels, depending upon the area of the platform on which the user is standing. In such embodiment, the wheel members are rotatably connected to the standing platform by rotatable casters or spherical wheels. The platform is preferably either circular or triangular in shape, with the wheels spaced evenly along the bottom side of the platform.

In another embodiment, there is provided a second platform which allows the user the option of sitting rather than standing while using the vehicle. The second platform is preferably mounted on the handle shaft so that it is pivotable between a storage position and a deployed or use position. In addition, a rider may stand on the second platform rather than the first platform.

In another embodiment, the vehicle is self-propelled rather than rider propelled, preferably having a motorized drive arrangement that is coupled to at least one of the wheel members to propel the vehicle when the drive arrangement is powered. A braking means as well as a means for controlling operation of the motor may also be provided.

In another embodiment, the vehicle is provided with a wind catcher attachment that enables the vehicle to be propelled by wind power. The wind catcher or sail may be rotated or adjusted to catch wind from any direction and may be provided in any number of shapes and sizes, and may be mounted to the handle with the bottom end connected to the vehicle platform by a rope or cord. In another embodiment, when not used as a sail, the wind catcher may be rotated so that it is positioned above the handlebar, where it may be used as a sun or rain umbrella.

In another embodiment, there is provided a wheelie vehicle having threadably detachable handle member, and in addition there is provided a snow board having a threaded aperture in which the detachable handle member can be alternatively mounted. In another slightly alternative embodiment, the snow board may be arranged to receive the entire vehicle, with the vehicle being slidably supported on the board. Such vehicle may then be used in snowy or slippery sloped areas.

In another embodiment, the vehicle is arranged and balanced so that a wheelie maneuver may be performed onto a pair of close set or ganged wheels, rather than a single wheel.

In any of the embodiments, the handle members may pivot so they can be folded in or out, and in addition, the handle members may slide out to make them longer or wider if desired, and may be mounted at a slight angle with respect to the support platform. In addition, the platform may be a rigid platform or may be provided with a shock absorbing means situated on the platform itself, between the platform and the wheel members, or in the wheel members. A braking system may also be included, preferably activated along the handle bar member or as a foot brake.

To perform a wheelie, the user will "pull up" on the handle and lean rearwardly on the vehicle so that the two front wheels are lifted off the ground and the user is balanced and supported only on the rear or a single tire. A pair of small "bumpers" may be mainly situated on rear edge of the platform on either side of the rear tire.

BRIEF DESCRIPTION OF THE DRAWINGS

FIG. 19 is an alternative version of the invention shown in an isometric side elevation showing a combination of the platform of the invention combined with an especially modified snowboard with the platform of the invention ready or positioned to be mounted upon the snowboard.

FIG. 20 is a rear view of the holding or mounting arrangement for securing the platform of the invention to the snowboard.

FIG. 21 is an isometric side elevation an alternative arrangement for securing the platform of the invention and particularly the wheels of said invention to a snow board.

FIG. 22 is an isometric side and top elevation of a vehicle or platform of the invention and a snowboard with a threaded handle ready to be threadedly attached to either the platform or the snowboard illustrating that the handle of the invention can also be used on a snowboard or other contrivance.

DESCRIPTION OF THE PREFERRED EMBODIMENTS

Figure 1:
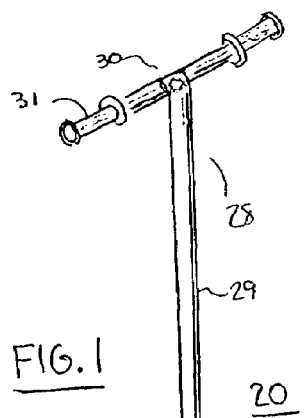
FIG. 1 is an isometric partially transparent depiction of a wheelie vehicle or platform in accordance with the present invention viewed from the right front.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

There are numerous wheeled vehicles on which, if one is particularly skillful, a rider can perform wheelie maneuvers. In addition, numerous auxiliary devices are available to aid one in balancing or maintaining a wheelie position. However, a primary consideration in the design of most of such wheeled vehicles is balance or stability in travel from one point to another, and they are designed so that they do not easily tip over and it is difficult to raise a wheel off the ground. Such vehicles usually have a long wheel base, allowing the riders weight to be distributed more or less equally between the wheels, creating a smoother ride and more stable vehicle. In addition, in those vehicles equipped with handlebars, such handlebars are situated generally over the front end of the vehicle making it relatively difficult for the rider's weight and the center of gravity of the vehicle to move to a position over one of the wheels. Despite the large number of wheeled vehicles known, therefore, so far as the inventor is aware, there are relatively few vehicles, other than toy vehicles, that are particularly designed to be used to easily perform wheelie maneuvers and stunts, wherein the vehicle is raised onto and operated on a single wheel or single set of wheels. The present inventor has, rather than providing an amusement vehicle such as a typical scooter or bicycle, which vehicles are designed primarily for riding on two or more wheels but which an innovative and creative rider can use to perform wheelies, alternatively conceived of an amusement or recreational vehicle that, while still having at a minimum two or more and preferably three ground contacting wheels, is constructed and balanced to be easily, or even primarily, used to perform wheelie maneuvers.

The primary embodiment of the invention includes a standing, or stand-on, platform having two or more ground-contacting members mounted along its underside and a handlebar member mounted extending upwardly from the platform. In such embodiment, the vehicle is made to have a short wheel base, generally making it more maneuverable than other known recreational-type vehicles such as scooters, skateboards, and coasters. The short wheel base makes it easier physically for a rider to perform a wheelie maneuver even though considerable, or even more, skill is required. By shifting his or her weight rearwardly on the standing platform and pulling back on the handle, the rider may raise the front wheels of the vehicle off of the ground with the slightest or a minimum amount of effort. With only a small change in attitude, the center of gravity of the vehicle moves over the rear wheel, so that the vehicle can be balanced and held in such wheelie position. The forward and rear balance necessary to maintain such attitude and return to a horizontal attitude of the vehicle or board is even more critical, however, and because of the single wheel at the rear the lateral balance necessary is the same or greater than with traditional wheelie performing vehicles such as bicycles and motorcycles or even greater because of the smaller diameter of the wheels. Thus, the fascination of trying to perform a wheelie and the satisfaction upon success in such performance and upon having others observe such success largely remains. Such self-same short wheel base, however, upon failure to attain the necessary balance enables the rider to quickly and easily step off without falling while maintaining control of the vehicle or wheeled board by means of the handle to prevent it from damage and/or injury to bystanders. In addition to its basic embodiment, the invention may be implemented in a wide variety of alternative embodiments. These may include being able to perform a wheelie maneuver onto a front wheel, or in other words performing a "nose wheelie," or on to any of the ground-contacting members. In addition, the vehicle may be either manually or self-propelled, wherein a motorized drive will be connected to the ground-contacting members, and may be operated in either a standing or seated position. The amusement vehicle of the invention may also be operated in combination with any number of auxiliary devices, such as a wind catching device whereby the vehicle may be propelled by wind power, or a snow board or ski member attachment whereby the vehicle slides across a slippery or sloped surface on such snow board or ski members. In other words, the vehicle or board of the invention may be in the form of a combination vehicle.

Figure 3:
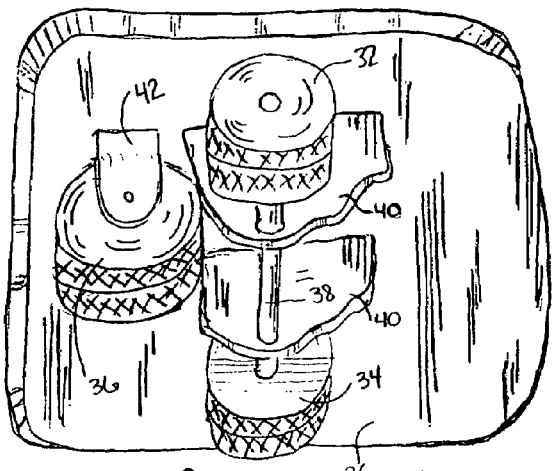
FIG. 3 is an isometric bottom side view of a wheelie vehicle or platform similar to that shown in FIG. 1 illustrating the mounting of the wheels on the platform but also having a blunt forward section rather than a generally triangular platform section.
Figure 4:
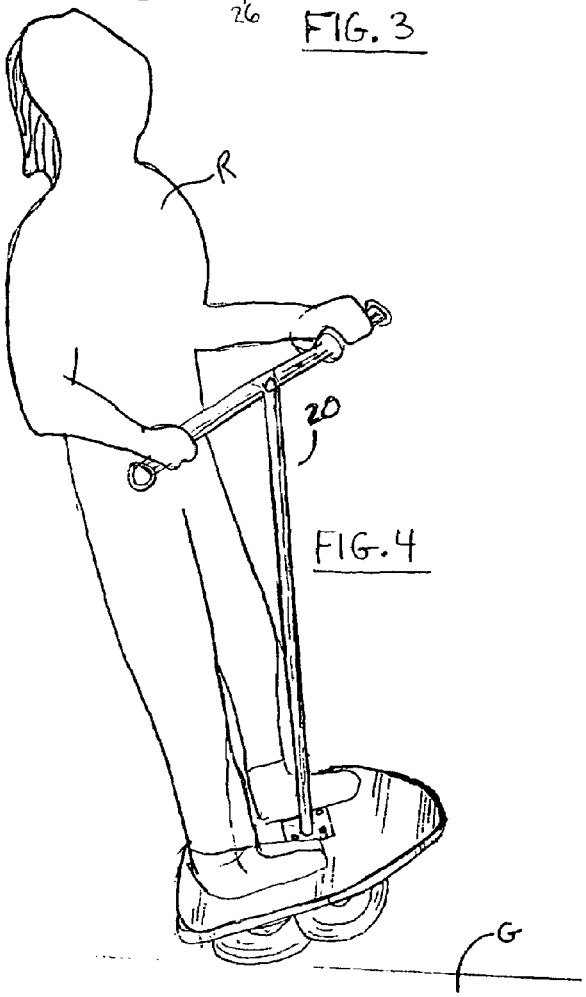
FIG. 4 is an isometric side view of a rider performing a wheelie on the vehicle or platform of FIGS. 1 through 3.

FIGS. 1-4 illustrate a first embodiment of a recreational or amusement vehicle incorporating the features of the present invention. Shown in FIG. 1 is a perspective view of such amusement vehicle designated generally by numeral 20. Vehicle 20 includes a support or standing platform 22 having a top side 24 and a bottom side 26. As shown in FIG. 4, platform 22 is designed to support a rider during use of the vehicle and may be provided in various shapes and sizes, although the platform is preferably dimensioned so that its width is great enough to accommodate the feet of a rider R standing in a generally normal or comfortable side-by-side position, and preferably extends somewhat rearwardly from the axis of the rearmost wheel member as described below. Platform 22 may be made of plastic, wood, metal, or any other suitably durable material. A handlebar assembly 28 including upwardly extending shaft 29 is mounted more or less centrally on platform 22, with handlebar 30 mounted on the upper end of shaft 29 with handgrips 31. Shaft 29 is preferably either mounted so that it is angled forwardly slightly with respect to platform 22, or alternatively may be curved so that sufficient room on platform 22 for the legs and torso of the rider R is provided.

Figure 2:
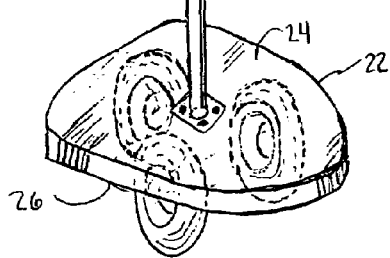
FIG. 2 is a front end view or elevation of the wheelie vehicle or platform shown in FIG. 1.

Referring now particularly to FIGS. 2 and 3, which are a rear view and a partial bottom perspective, or more properly isometric, view of recreational vehicle 20, respectively, mounted along the bottom side 26 of platform 22 are several ground contacting members, shown as laterally aligned first and second front wheel members 32 and 34 and rear wheel member 36. Front wheel members 32 and 34 are supported on wheel axle 38, which in turn is connected to the bottom side 26 of platform 22 by axle support 40. Similarly, rear wheel 36 is connected to the bottom side 26 of platform 22 by wheel bracket or housing support 42. Supports 40 and 42 may be either integrally formed or separately mounted to platform 22, depending upon the nature of the construction of such platform.

Figure 3A:
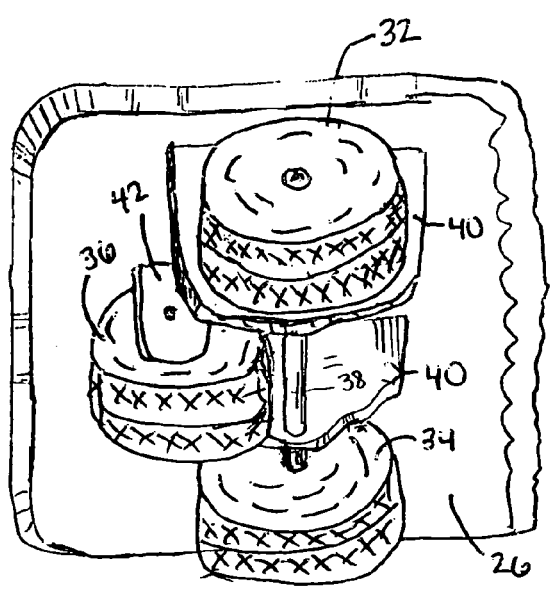
FIG. 3A is an isometric bottom side view similar to FIG. 3 but having a smaller wheel base and slightly larger wheels.

Vehicle 20 may be put into motion by the rider R placing one foot on one side of platform 22 and the other foot on the road or ground surface to one side or to the rear of the vehicle, and then pushing with the leg so that the vehicle is propelled forwardly. The rider R then will place both feet on platform 22 and ride or coast on vehicle 20. Wheel members 32-36 are preferably arranged so that when vehicle 20 is at rest and rider R is standing on platform 22, rider R may easily balance him or her self on the platform. In other words, vehicle 20 is preferably statically stable. Vehicle 20 preferably has a short wheel base, which not only makes the vehicle more easily maneuvered, but also makes it possible for rider R to perform a wheelie maneuver with relatively little effort or difficulty. It also makes it easy for the rider to step on the platform 22 with a minimum of effort or contortions. The wheel base may be arranged so that when viewed from the side or lateral edge the wheels overlap partially, with wheel 36 extending partially between wheels 32 and 34. See FIG. 3A which is a bottom view of platform 22 as shown on FIG. 3 but having a slightly shorter wheel base with wheel 36 partially overlapping with or situated between wheels 32 and 34. Wheels 32-36 in FIG. 3A are also slightly larger than in FIG. 3. Starting with all of wheel members 32-36 in contact with the ground, rider R may then, as shown in FIG. 4, lean rearwardly on the vehicle, while at the same time gripping and pulling generally rearwardly on handle 28. This will cause front wheels 32 and 34 to lift off of the ground surface G, with vehicle 20 now balanced only on rear wheel 36. Due in large part to the short wheel base of vehicle 20 and the position of handle 28, lifting front wheels 32-34 is accomplished with little effort on the part of rider R. However, remaining in a balanced position once raised upon one wheel will be found to take considerable practice and skill providing a significant challenge to the rider. If ground surface G is sloped or inclined, rider R may remain on platform 22 in a wheelie position until the forward momentum of the vehicle is exhausted. Alternatively, the rider may repeatedly place his or her foot on the ground and push off forwardly so that the vehicle remains in motion. Usually the vehicle will be allowed to return to multi-wheel support before accelerating it by foot contact with the ground. However, very skillful riders may be able to mange foot acceleration while in wheelie position or attitude.

Different numbers and types of ground contacting members may be advantageously used in various embodiments of the invention, depending upon the particular application for which the vehicle is suited. The size and type of wheels provided on the vehicle may be changed depending upon the intended use of the vehicle. For example, for riding on paved or more or less smooth surfaces, smaller wheels with less ground clearance for the platform will be suitable. However, for rocky or rough surfaces, larger and/or wider tires that can carry the vehicle over such obstacles may be necessary. Larger tires will also give the platform enough ground clearance to be carried over such obstacles. A combination of smaller side wheels and a larger central wheel may also be suitable. Furthermore, the tires or wheels may be inflatable or solid as may be desired.

Figure 5:
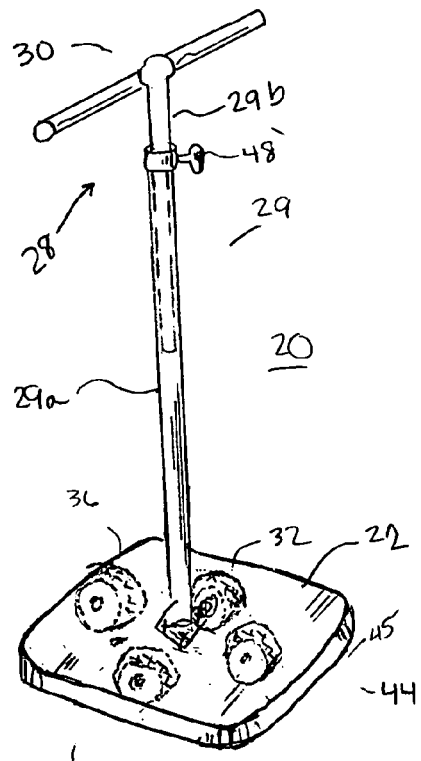
FIG. 5 illustrates an isometric right front view similar to FIG. 1, but of an alternative version of the wheelie vehicle having a generally rectangular platform such as shown in FIG. 3 but having an additional wheel at the front plus an adjustable height handle.

FIG. 5, which is an isometric view, illustrates an alternative embodiment of the invention from that described above with reference to FIGS. 1-4 having, as shown, a fourth ground engaging or wheel member 44 mounted forwardly on the underside 26 of platform 22 with respect to wheels 32 and 34. The axis 45 of wheel member 44 is preferably substantially equidistant from the axis of wheels 32 and 34 as is also the axis of rear wheel 36, thereby maintaining the overall short wheel base of vehicle 20. The addition of front wheel member 44 enables riders of vehicle 20 to either stand on platform 22 over rear wheel member 36 or front wheel member 44, so that a wheelie maneuver may be easily performed on to rear wheel member 36 or front wheel member 44. In addition, a rider standing over rear wheel member 36 may also be able to perform a so-called "nose wheelie", wherein rear wheel member 36 and center wheel members 32-34 are lifted off of the ground. In this position, the rider will lean forwardly until the center of gravity of vehicle 20 is over the front wheel member 44. Of course, only very skillful riders should attempt to perform a "nose wheelie," since the handle 29 is in the way of a rider falling or dismounting in a forward direction unless the rider first moves around the handle.

Also shown in FIG. 5 is a recreational vehicle in accordance with the teachings of the present invention having a handle assembly 28 wherein the height of shaft 29 is adjustable. More particularly, shaft 29 as shown in FIG. 5 includes an outer portion 29a and one or more telescoping inner extension portions 29b which may be placed or adjusted at various extensions or lengths and then secured in position by hand screw clamp 48. As a result, the length of shaft 29 may be adjusted depending on the height or comfort position of particular riders. A lower portion of extension 29b is shown in phantom within the lower portion 29a of the handle 29.

Figure 6:
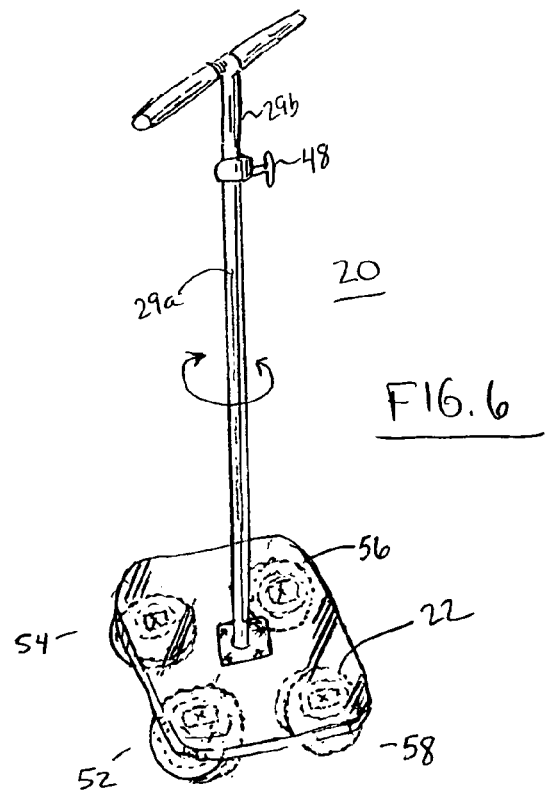
FIG. 6 is an isometric view similar to FIG. 5 but with four roller-type wheels arranged at the corners of the rectangular platform.

FIG. 6 illustrates another alternative embodiment of vehicle 20 also having four ground engaging members mounted to platform 22, designated here by the numerals, 52, 54, 56, and 58, but with such members having a spherical shape. As a result, vehicle 20 can be moved in any direction on such ground engaging members. The spherical wheels are shown positioned at the corners of the platform but this is optional and in fact the wheels could be arranged as shown in FIG. 5. In addition, ground engaging members 52, 54, 56, and 58 remain in close proximity to one another so that vehicle 20 continues to have a short wheel base and can easily perform wheelie maneuvers. In addition, handlebar assembly 28 is swivelable within a 360 degree angle so that it may be positioned in front of the rider no matter where he or she stands on platform 22. Alternatively, inner telescoping portion 29b of shaft 29 may be turned and secured with handlebar 30 at the appropriate angle using hand screw 48. Note that the wheel arrangement still essentially comprises two side by side main wheels, a single in effect rear wheel plus an auxiliary forward wheel. However, in the embodiment shown in FIG. 6 any of the wheels can be identified as the rear, forward and side wheels depending upon which way the platform is propelled. A wheelie can also be performed on two wheels if the platform is propelled in a suitable direction with respect to the wheels. The spherical wheels shown in FIG. 6 are a known construction in which a spheroid is contained in a somewhat more than half spherical housing having ball bearings in its walls which support and allow movement of the spherical wheel in any direction depending upon the direction force is applied to the platform.

Figure 7:
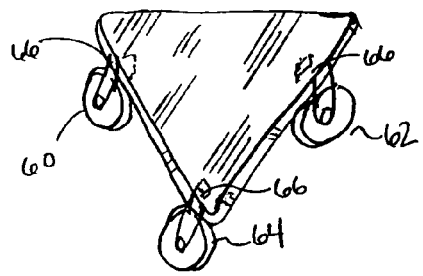
FIG. 7 is an isometric view of a platform having caster-type wheels at the corners of a triangular platform.

FIG. 7 illustrates another slightly modified alternative embodiment wherein the ground engaging members, rather than being spherical as in FIG. 6, rather are provided as caster type wheels 60, 62, and 64 mounted to platform 22 by swivelable casters 66 so that platform 22 may also be moved in any direction. As with the other embodiments, caster wheels 60, 62, and 64 are mounted to platform 22 in close proximity to one another so as to maintain a relatively short wheel base, so that a wheelie maneuver may be performed on to any one of such wheels with minimum difficulty. The caster construction must be made with very close tolerances and clearances so the movement of the platform is smooth and uniform else the wheelie platform will be difficult to use.

As will be understood from the above description and appended drawings 1 through 7, the "wheelie" vehicle of the invention comprises basically and preferably a simple short wheel base vehicle in the form of a riding platform which may be constructed of various fairly rigid strong structural materials such as plastic, light metal such as thin formed sheet materials, wood and the like provided with preferably at least three relatively small wheels of sufficient diameter, however, to negotiate small imperfections in a traveling surface such as cracks between cement blocks in a pavement, imperfections in a road surface or the like. The wheels, therefore, should be usually at least as large as the wheels on a skate board and preferably somewhat larger such as one and a half times as large as a skate wheel, but may be larger, for example, as much as four to six inches in diameter. However, since the performing vehicle is to have a fairly short wheel base such as one to two and a half feet between wheels and preferably about one and a quarter to one and three quarter feet to accommodate skill in its use and to maintain the ability of the user to dismount from the platform upon losing control yet retaining hold of the controlling handle. The three basic wheels of the vehicle will be arranged in a triangular configuration with one wheel to the rear and two to the front making the execution of wheelies more demanding, since the rider must maintain stability not only front to back when performing a wheelie, but laterally to the side on the one wheel as well. This, of course, does not prevent the use of additional forward wheels or the use even of small or auxiliary rear wheels usually laterally of the main rear wheels to maintain lateral stability particularly during training in use of the platform. The two or more forward wheels should be matching in size, but the rear "wheelie wheel" need not match the other wheels in size, although it should have sufficient diameter to as pointed out negotiate cracks and the like in the operational surface. The handle should have sufficient height so as to be comfortably grasped by the rider while standing on the platform and to be easily retained in the riders hand when dismounting from the platform either voluntarily or involuntarily.

In addition, while it is preferred to have a single rear wheel upon which wheelies are performed increasing the skill exhibited in performing such maneuvers, it should be understood that for additional strength such wheel may be constructed as combined or ganged wheels journaled at the ends of short oppositely mounted axles on a central strut or a single axle accommodating two small wheels mounted side by side for additional strength and load bearing capacity, but having their ground contact points relatively close together. These "ganged" wheels perform essentially as one support mechanism or surface, but support equivalent weights by smaller diameter circular sections. See in this regards FIGS. 23 and 23A.

Figure 10:
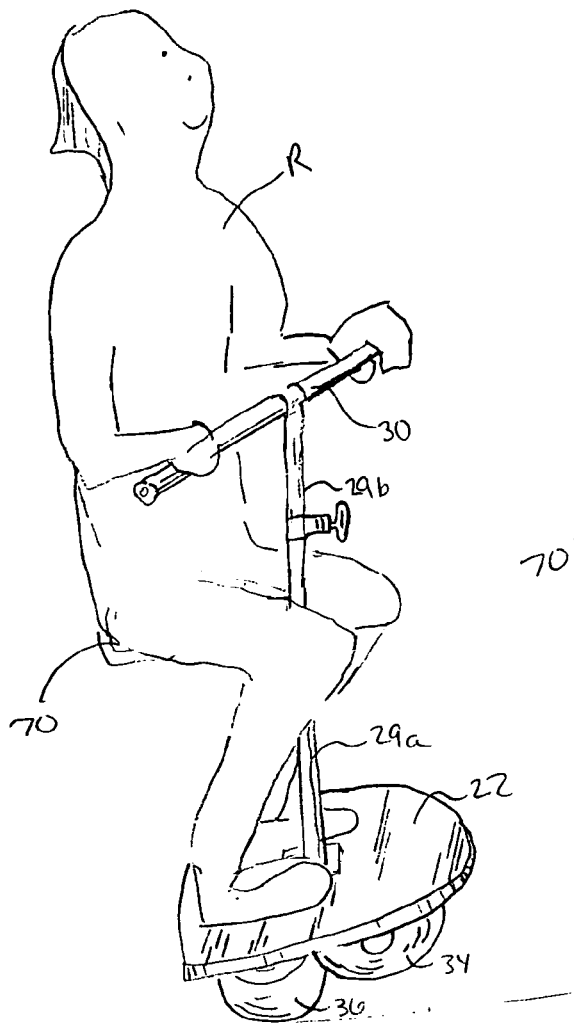
FIG. 10 is an isometric right front view of the vehicle shown in FIG. 8 with a rider on the seat performing a wheelie.
Figure 8:
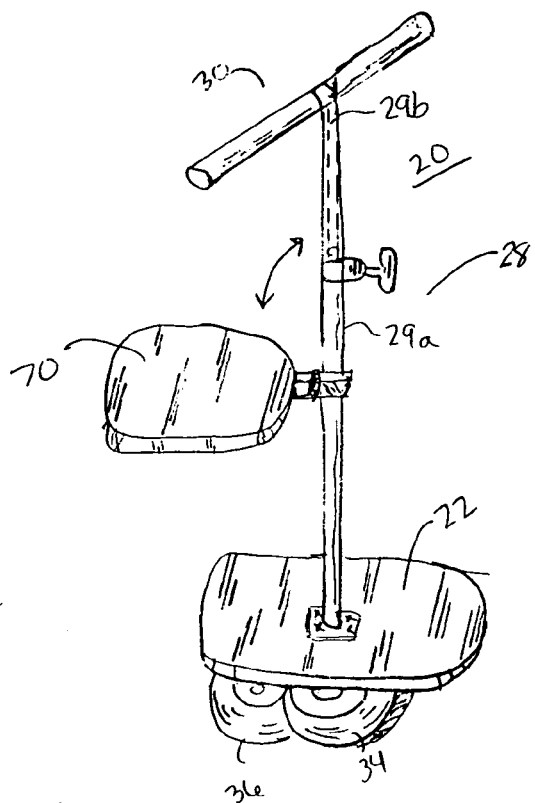
FIG. 8 is an isometric side elevation of the wheelie vehicle or platform of the invention as shown in prior figures with the addition of an adjustable seat to the handle.
Figure 9:
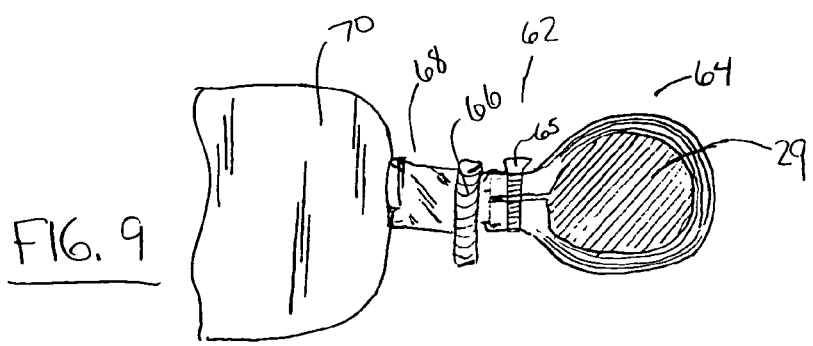
FIG. 9 is a plan view partially in section of the seat arrangement shown in FIG. 8.
Figure 11:
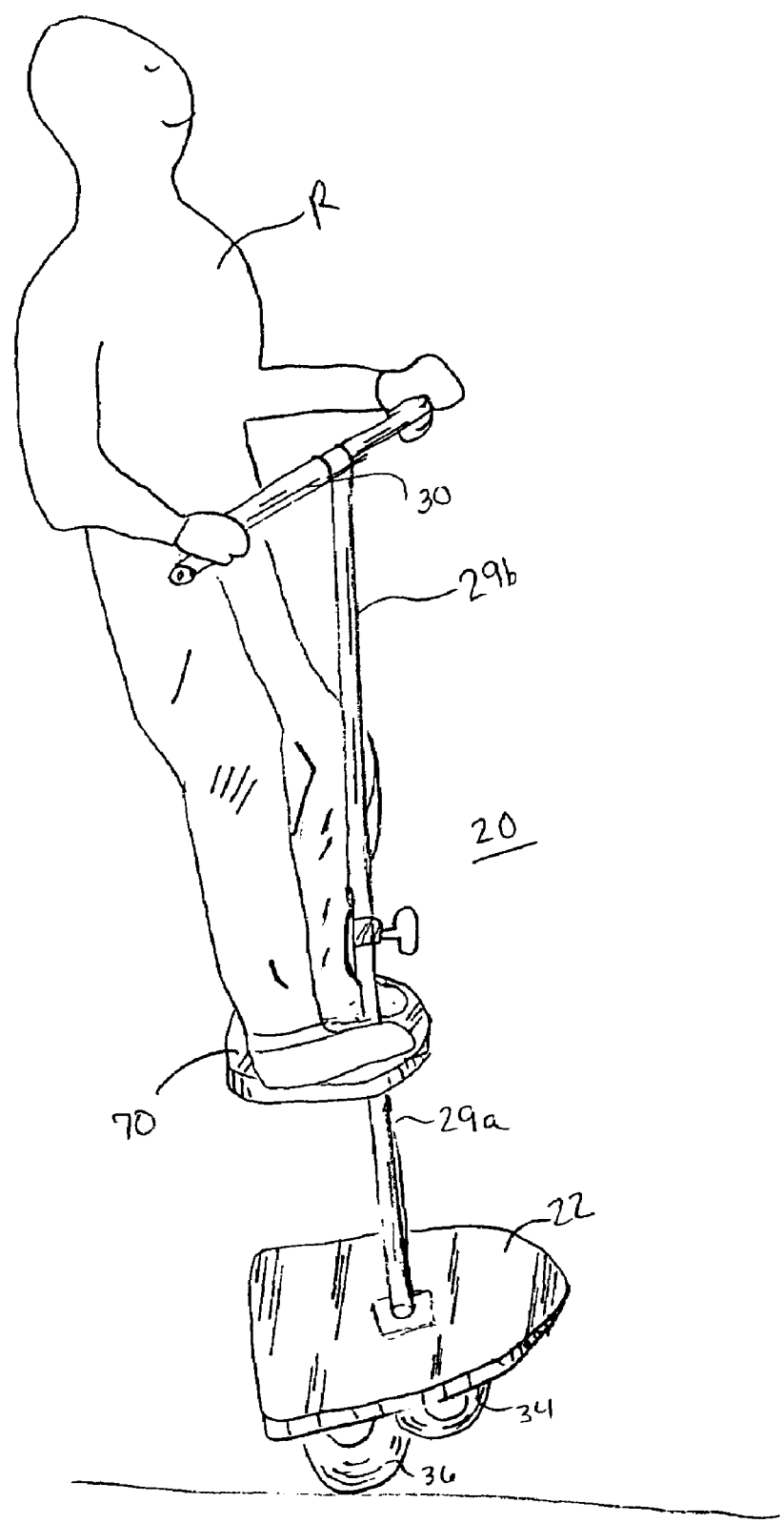
FIG. 11 is an isometric view of the wheelie vehicle similar to FIG. 10 showing a rider standing on the seat with the handle extended while doing a "wheelie."

FIGS. 8-11 illustrate another alternative embodiment of the vehicle of the invention. Such embodiment is similar to the previous embodiments but additionally includes a secondary platform 70 hingedly connected to shaft 29 of handlebar assembly 28 via connector 62. Connector 62, shown in FIG. 9, may be of many different types well-known to those skilled in the art, but as shown, includes a sleeve 64 that is secured or clamped around shaft 29 by screw 65. A spring-loaded hinge 66 is mounted between sleeve 64 and plate 68, which plate is attached to secondary platform 70. As indicated by the double-sided arrow in FIG. 8, platform 70 may be alternately moved between a storage position in parallel with shaft 29 and a deployed position perpendicular to shaft 29. As shown in FIG. 10, platform 70 may be used as a seat for rider R when riding and performing wheelie maneuvers on vehicle 20. Alternatively, as illustrated in FIG. 11, a more adventurous or daring rider R may also stand on platform 70. With the overall length of telescoping shaft 29 adjusted accordingly a rider standing on platform 70 can easily grip handlebar 30 when vehicle 20 is used in such a manner. Rider R may also choose to squat, kneel in position on the platform, or otherwise utilize either platform 22 or 70 as desired in any of the embodiments. The height of platform 70 on shaft 29 may also be adjusted depending upon the particular rider.

Figure 13A:
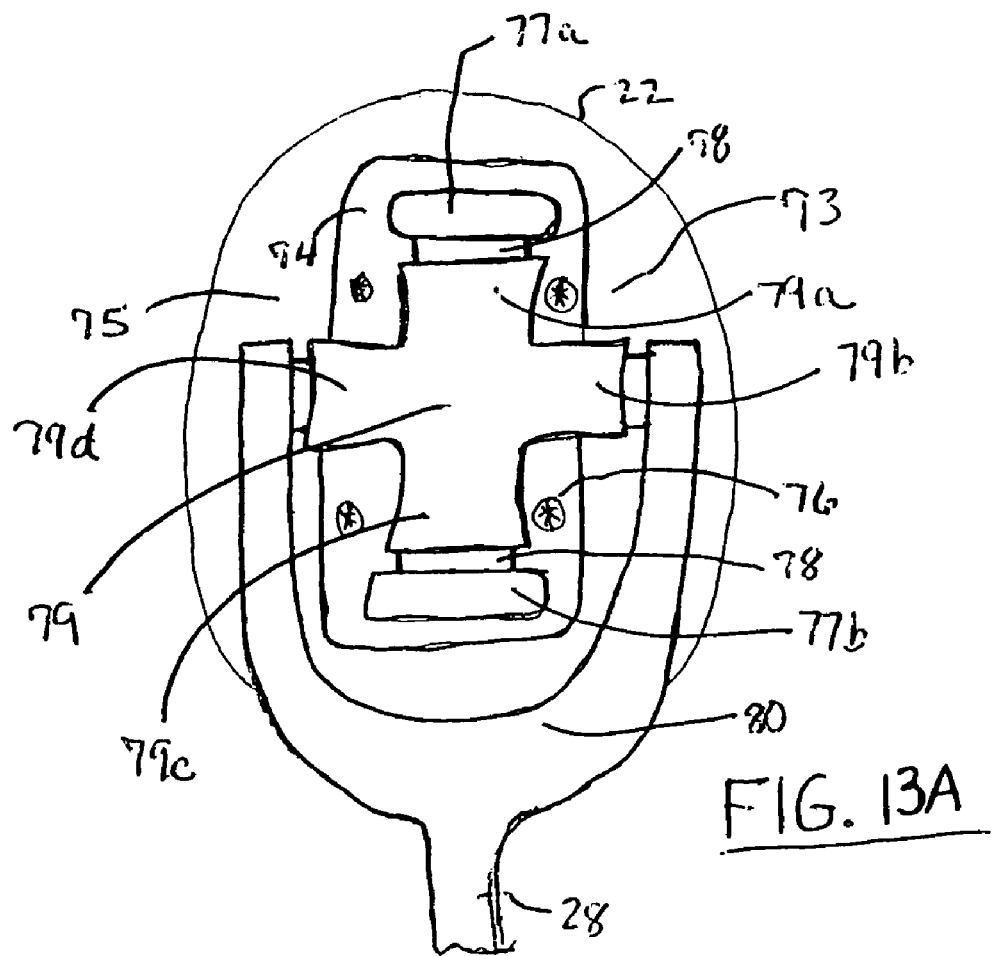
FIG. 13A is a plan view of a further universal connection of the handle with the platform.
Figure 13:
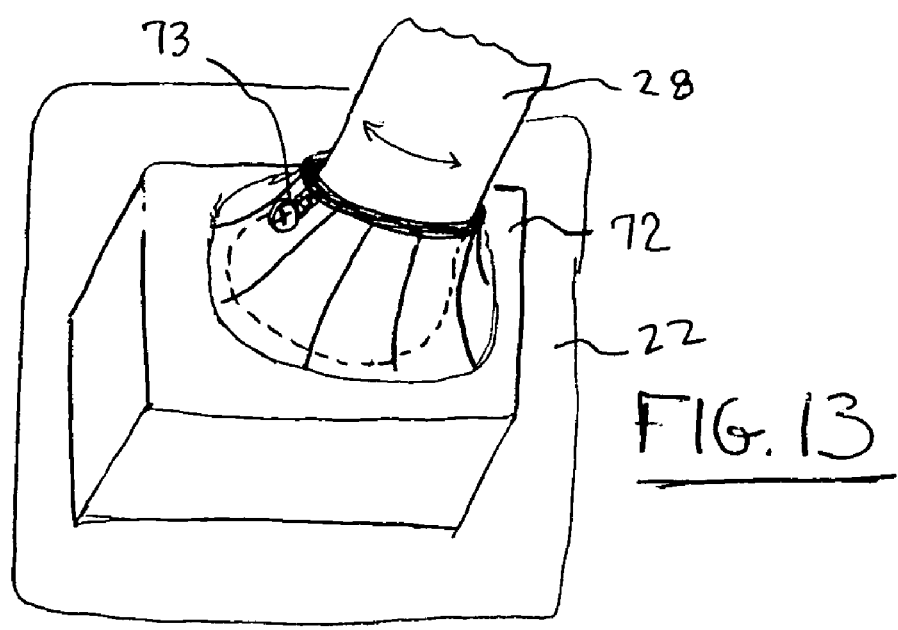
FIG. 13 is a detail of the connection of the adjustable handle with the platform.
Figure 12:
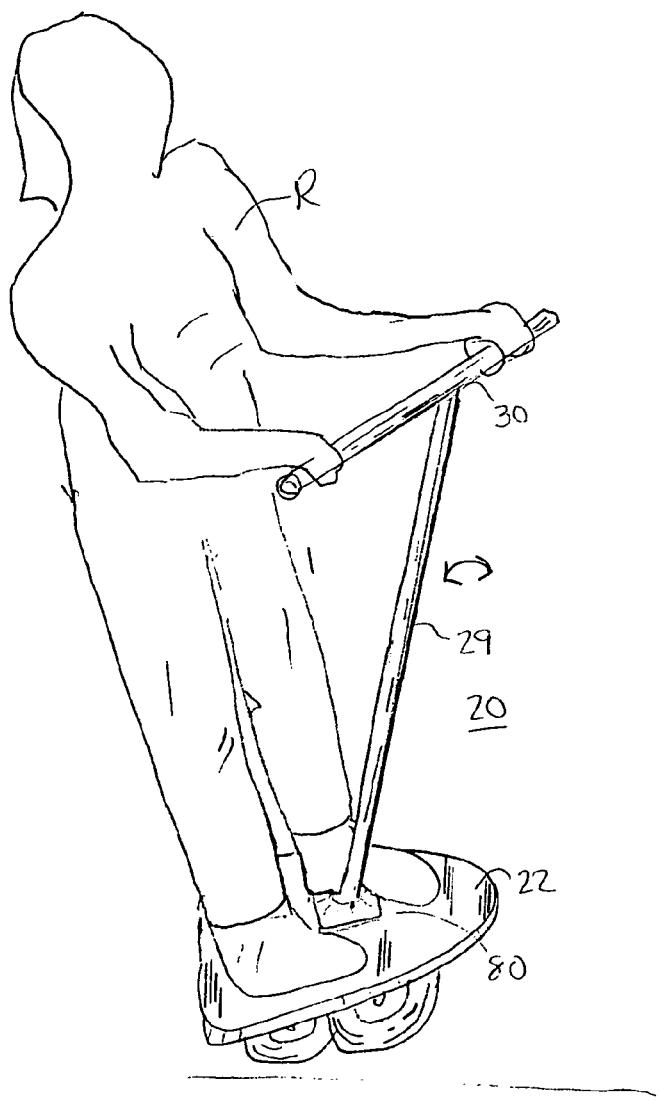
FIG. 12 is an isometric view similar to FIGS. 10 and 11 but with a universally adjustable handle moved forward by the rider who is standing on the platform.

As described above with reference to the embodiments shown in FIGS. 1-11, handlebar assembly shaft 29 is rigidly connected to platform 22 of vehicle 20, although it is preferably either positioned at a slight angle with respect to platform 22 or has a curved portion to allow sufficient room for rider R to position his or her body on the platform. It is preferred that handlebar assembly 28 be connected or mounted substantially in the center area of platform 22 so that the center of gravity of vehicle 20 remains close to the rear wheel or wheels and it is easier to lift to perform wheelie maneuvers. However, as illustrated in FIGS. 12, 13, and 13A, handlebar assembly 28 may also be, sometimes preferably, connected so that it is movable or its angle is adjustable with respect to platform 22. FIGS. 12 and 13 illustrate one manner in which handlebar assembly 28 may be swivelably connected to platform 22, while FIG. 13A illustrates another type of swivel connection. However, it should be evident to one skilled in the art that there are a large number of connection arrangements available that would be suitable for swivelably connecting the handlebar assembly. In the embodiment shown in FIG. 13, swivel connector 72 is mounted by bolts or the like to platform 22. Connector 72 allows handlebar assembly 28 to be moved forwardly, side to side, or any angle within a 360 degree range as indicated by the arrow. Preferably, connector 72 allows handlebar assembly 28 to be secured or locked at a particular position or angle if desired. Such locking may be effected by means of a threaded jam bolt 73 inserted into the side of the swivel connector fitting as shown in FIG. 13.

FIG. 13A is a top plan view illustrating another possible swivel arrangement for enabling handle assembly 28 to be rotated or moved to virtually any angle within a 180 degree range in four separate directions, using a universal bracket arrangement 73. Universal bracket 73 is attached to platform 22 on support plate 74, preferably in a depression 75 formed in the surface of the platform, by fasteners 76. Spaced apart pivot supports 77a and 77b extend upwardly from support plate 74. Each pivot support 77a and 78b has an inwardly extending knob or tab 78 on which four-way bracket or universal joint member 79 is pivotably supported. Four-way bracket or universal joint member 79 is comprised of four outwardly extending flanges 79a, 79b, 79c, and 79d situated at right angles to each other. Flanges 79*a* and 79*c* are connected between pivot supports 77*a* and 77*b* on tabs 78 so that bracket 79 is pivotable on such supports. Handle 28, which is modified with clevis portion 80 on its lower end, is then pivotably connected to bracket 79 extending between flanges 79*b* and 79*d* in a similar manner. Since flanges 79*a-d* are at right angles, handle assembly 28 may be placed at virtually any desired angle or inclination by rotating four-way bracket 79 on flanges 79*a* and 79*c* and simultaneously rotating clevis portion 80 of handle assembly 28 on flanges 79*b* and 79*d*. The arrangement does not have the complete flexibility to be inclined in any direction or inclination, however, in the manner of the universal joint shown in FIG. 13 as while the joint can be inclined in four directions, it cannot be rotated to any angle or direction in four directional quadrants. This, however, can be an advantage in control of the platform by the handle 28, since it enables the rider to exert sidewise force to the base or platform in selected directions.

Figure 14:
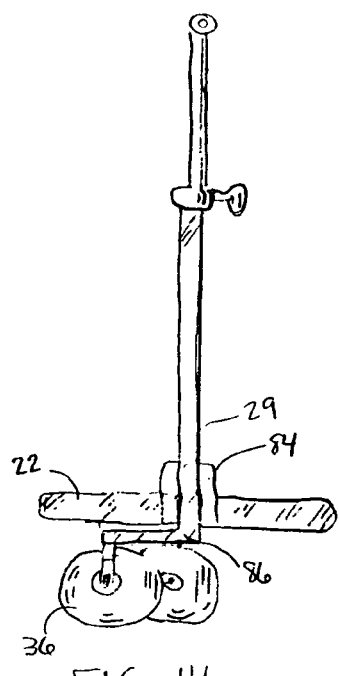
FIG. 14 illustrates another embodiment of the invention wherein the side view of the platform of the invention partially in section shows a steering arrangement for the rear wheel of the platform.

In addition to being used to maintain one's balance on vehicle 20, handlebar assembly 28 may also be rotatably secured to platform 22 and used to steer vehicle 20. FIG. 14 illustrates in cross-section one possible steering arrangement wherein shaft 29 is rotatably connected to rear wheel 36. Base or cylinder 84 is connected or positioned in platform 22 and extending upwardly from such platform 22, and may also extend downwardly through an orifice in platform 22. Shaft 29 of handlebar assembly 28 is rotatably secured in cylinder 84 to platform 22. The lower end 86 of shaft 29 is attached to the shaft of rear wheel 36, so that by turning handlebar assembly 28 about cylinder 84 for steering purposes, wheel 36 will correspondingly be turned. Shaft 29 may be situated directly above rear wheel 36 or, as shown in FIG. 14, the lower end 86 of shaft 28 may extend rearwardly from cylinder 84 to rear wheel 36. In operation, therefore, when a wheelie maneuver is performed, rider R by turning handlebar assembly 28 may also rotate rear wheel 36 and steer vehicle 20. The offset arrangement shown in FIG. 14 tends to be self adjusting in that continued forward movement of the platform will tend to bring the trailing lower end 86 of the shaft 29 back into forward rear alignment. A further arrangement in which the wheel 36 is journaled directly onto the end of the shaft 29 is easier and quicker to steer, but suffers from the lack of self correcting if oversteering is accidentally effected.

Figure 15:
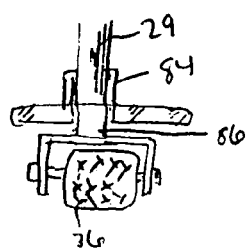
FIG. 15 illustrates another alternative embodiment of a steering arrangement of the rear wheel of the platform.
Figure 16:
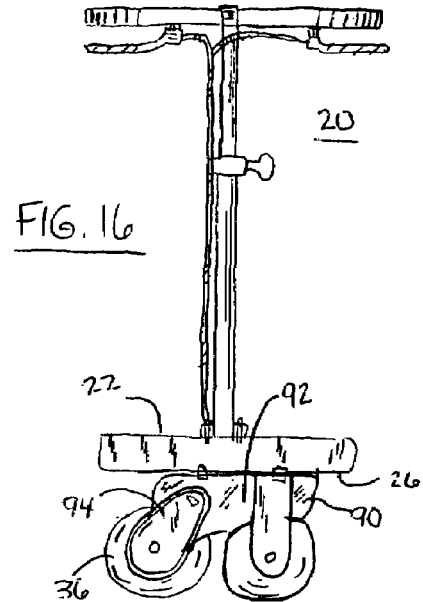
FIG. 16 is a side view of a motorized version of the wheelie vehicle or platform of the invention in which the rear wheel is driven by a motor located beneath the platform through a belt drive.

In another embodiment, vehicle 20, rather than being manually propelled, may be motor driven. As illustrated in FIG. 16, motor housing 90 holding a motor 92 is mounted to the bottom side 26 of platform 22, with drive belt 94 connected to rear wheel 36. The belt 94 will apply a torque and cause rotation of wheel 36. Motor 92 may be gas, battery, or electric powered. A means for varying the speed of or turning off motor 92, not shown, will preferably be provided within easy reach of the rider, such as on handlebar assembly 28. In operation, as the motorized vehicle assembly is propelled forwardly by motor 92, the rider can perform wheelie maneuvers as easily if not more easily than on the manually propelled embodiments of the invention. A motor assembly such as that described above may be provided with any of the various embodiments of the invention, with the motor belt 94 connected to any one or more of the wheels or wheel axle as may be desired. For example, while not shown in FIG. 16, the motor assembly may be easily mounted to the steerable version of the invention described above with reference to FIGS. 14 and 15. In each of such embodiments, the short wheel base of the invention is maintained or the vehicle is otherwise balanced so that it is easy to perform wheelie maneuvers. With the motorized version, wheelies may be performed more easily on flat or even slightly upwardly sloped surfaces, which could only be performed for short distances or not at all in the manually propelled versions.

In operating the platform-type wheelie performing vehicle of the invention the rider will normally push the vehicle with one foot in scooter fashion until sufficient speed is attained, meanwhile controlling the platform both by weight application of the other foot and by control of the handle and when sufficient speed is attained will step completely upon the platform all the time grasping the handle of the vehicle to maintain control of the platform. The rider will usually place his or her two feet beside the handle on the upper surface of the platform. In other words, the handle will be between the feet of the rider. Balancing is attained primarily by shifting the weight of the rider upon the platform while the handle is used primarily to hold the rider on the platform plus basically to retain hold of the vehicle. Thus, the vehicle does not roll away like a skateboard if the rider falls off. Upon reaching the speed and physical location where the rider wishes to perform a wheelie maneuver, he or she will rock back onto his or her heels and at the same time usually pull back on the handle tipping the short wheel base vehicle back upon its rear wheel where it will be balanced as it glides along the ground by continuous differential adjustment of pressure from the feet of the rider and differential force upon the handle applied by the hands of the rider. In all of the embodiments but particularly in that shown in FIGS. 12 and 13 where the handle is inclination adjustable the force applied by the handle will be primarily upward to retain the rider on the short wheel base platform. Upon performing a wheelie far enough and as the speed of movement decreases, the rider may either apply forward pressure to the platform and/or the handle and bring the platform down again upon all its wheels, at which point it may again be accelerated over the ground surface and another wheelie performed or the rider may pick up the board and return to its starting point. Alternatively, after performing a wheelie when the velocity begins to drop to less than the rider judges to be desirable, the rider may simply step off the platform while retaining a grasp upon the handle, in which case the platform will be stopped in its tracks as the length and angle of the handle bring it to a stop. The platform is relatively small and light so that its momentum once the rider steps off is easily dissipated by pulling back on the handle. If moving fairly quickly, the momentum may even be dissipated by the platform being held captive by the rider holding the handle and allowing the vehicle to swing in an arc upwardly away from the ground quickly expending its energy against the force of gravity. As explained elsewhere, the fact that the platform is relatively small and light and has only one wheel in the rear upon which wheelies are performed makes such performance consistently very skill dependent thereby retaining the interest of the rider and retaining the respect and admiration of observers for good wheelie performance, while the use of the handle not only aids in making good wheelies, but enables the user to retain control not only when mounting the vehicle, but also when dismounting either voluntarily or involuntarily.

As will be understood, these remarks with respect to the method of using the wheelie vehicle of the invention apply particularly to the embodiments shown in FIGS. 1 through 7, except that where an extra front wheel is included as shown in FIGS. 5 and 6 to facilitate the performance of so-called "nose wheelies" the rider will lean forward rather than rearwardly to shift the vehicles and riders weight forwardly to the nose wheel. The provision of a seat on the handlebar as in FIGS. 8 through 11 does not greatly vary the actions of the rider and again the steering and grasping changes implicit in FIGS. 12 through 15 also do not greatly change the basic technique of operation of the amusement vehicle of the invention. Again, the use of a self contained motor in the amusement vehicle as shown in FIG. 16 merely means that the vehicle does not have to be pushed as fast to gain forward momentum and grasping of the handle still enables the rider to retain control of the amusement of the vehicle as a whole as the operating controls are located on the handle.

With respect to the following described FIGS. 17 through 22 on the other hand, the amusement vehicle cannot only be used alone to perform wheelies, but also includes or may include other appurtenances such as sails, snowboards and the like which render the basic vehicle useful for other activities and essentially enable it to be used for alternative or complementary activities.

In addition to being manually or rider-propelled and motor propelled, vehicle 20 in accordance with the teachings of the present invention may also use the wind or wind currents to propel the vehicle using a sail device attached to the vehicle. Using the sail device, a rider will not become as fatigued as when the vehicle is only manually or rider propelled, and may also allow the rider to go faster and move over flat or even upwardly sloped surfaces with little trouble while performing a wheelie maneuver. Various sail arrangements may possibly be used with the vehicle. For example, a mast having a sail could be attached to shaft 29 of handlebar assembly 28, with shaft 29 serving as an improved boom for the sail. However, such a sail may be inconvenient as it may interfere with the rider's positioning on the vehicle platform.

Figure 17:
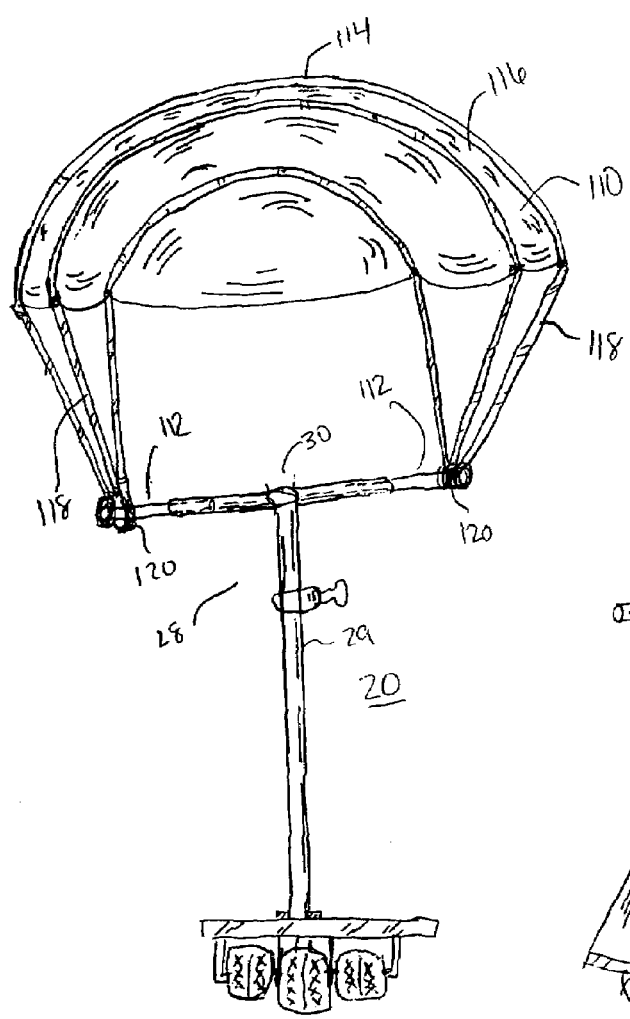
FIG. 17 is a rear elevation of an alternative embodiment of the invention in which a sail arrangement is attached to or mounted upon the handlebars of the vehicle.
Figure 18:
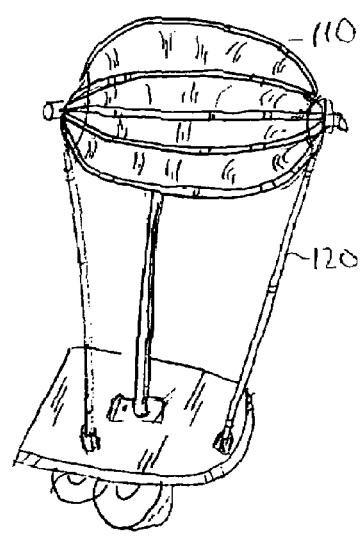
FIG. 18 is an isometric side view of an alternative version of a sail or umbrella arrangement for the wheelie vehicle or platform of the invention.

Thus, as shown in FIGS. 17-18, the inventor has conceived of a more efficient arrangement wherein the sail device may be alternatively positioned so it may be used as a wind-catcher or as a sun umbrella. More particularly, there is shown in FIG. 17 vehicle 20 in accordance with teachings of the present invention as described above having sail device 110 mounted to handle members 30, which in such sail embodiment are adjustable as to lengths using one or more telescoping extensions 112 on the ends of the handle. Sail device 110 is comprised of several stiffening members 114 that are covered by a sheet material 116 such as nylon or any other durable material suitable for use as a sail or umbrella. Rigid arms 118 having clamps or connectors 120 of a usual type on their lower ends are used to mount sail device 110 on handle extensions 112 or directly to handle 30. In FIG. 17, sail device 110 is situated so that it is substantially above vehicle 20 and particularly handlebar assembly 28 so that it is primarily being use as an umbrella rather than as a sail. However, as illustrated in FIG. 18, sail device 110 may be mounted so that it is extending outwardly to the side on handle members 112 and therefore is capable of catching wind currents in a manner that will cause the vehicle to be propelled forwardly. Additional arms 120 or connectors may be used to connect sail device 110 directly to platform 22.

Figure 18A:
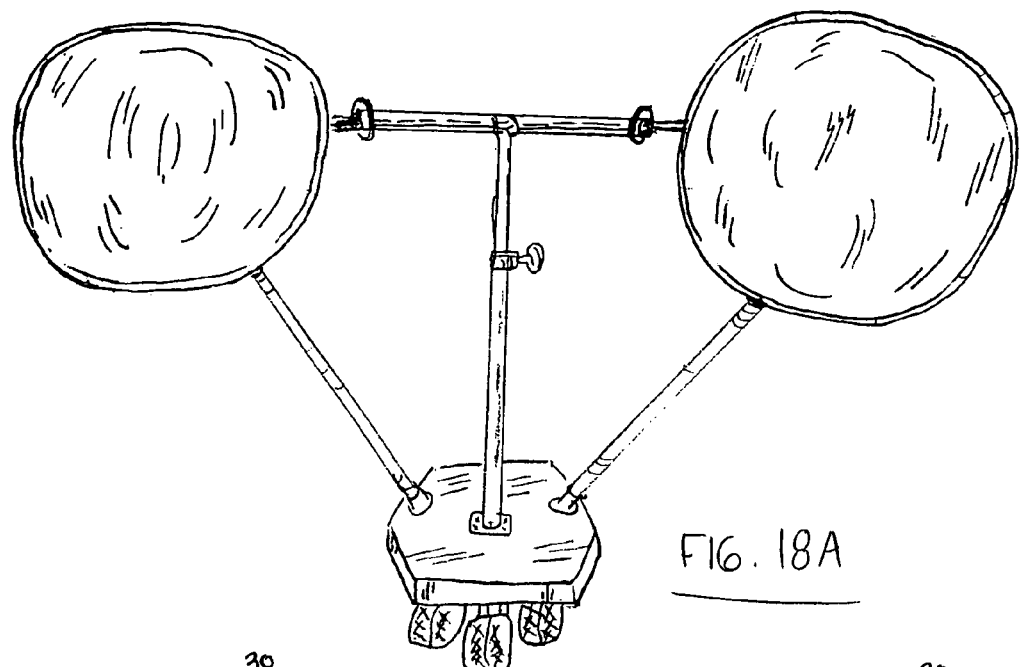
FIG. 18A is a rear isometric view of a still further sail arrangement for the wheelie vehicle or platform of the invention.

FIG. 18A illustrates another alternative wind-catching arrangement wherein wind catchers 124 and 126 are mounted to platform 22 via support poles 128 and 130 and to handle 30 so that they are disposed on either side of a rider of the vehicle. The position or angle of wind catchers 124 and 126 may be adjusted depending on the direction or speed of the wind so that more or less wind energy may be utilized as desired. Wind catchers or sails having different shapes and sizes may be used with vehicle 20 as desired. Preferably the wind catchers or sails 124 and 126 are adjustable so that can be acted upon by or "catch" the wind from the side as well as the back so the board may sail "off the wind" so to state. Adjustment may be accomplished by rotating the entire handle 30 or alternatively partially rotating the two wind catchers or sails on the end of the handle 30. Because the platform 22 is itself quite light in weight the wind velocity and size of the sails must only be sufficient to propel the rider himself or herself across the type of support surface involved a fairly smooth surface being highly preferable not only for wheelies but also for "sailing."

In addition to being propelled using wind power, the inventor also envisions that the vehicle of the invention may be fitted with skis or a snowboard so that such vehicle may slide across a slippery or frozen surface. FIGS. 19-20 illustrate one such possible arrangement wherein vehicle 20 may be mounted on a snowboard 130 in a shelved vehicle platform receiving device 132 integrally attached to the snowboard by screws or other suitable means. Platform receiving device 132 has a partially cut away top surface 134, side surfaces 136, and front surface 138, and is large enough so that the wheels and platform of vehicle 20 may be completely enclosed therein. Shelf or lip 140 on the interior of platform receiving device 132 spaced from top surface 134 a distance slightly larger than the thicker W of platform 22. Thus, platform 22 may be snugly positioned in receiving device 132 with platform 22 situated between top surface 134 and shelf or lip 140 and with the wheels of device 20 contained in the space between the shelf 140 and the top surface of the snowboard 130. Once vehicle 20 has been placed in platform receiver or holder 132 which can also be referred to as simply container 132, hinged door 142 having locking means 144 is closed and locked over the rear side of container 132, thereby securing vehicle 20 in container 132 on snowboard 130. Vehicle 20 housed in container or platform receiver 132 on snowboard 130 may then be used in a manner similar to a regular snowboard, but with the rider standing on platform 22 rather than on the top surface of snowboard 130. While it is not intended that wheelies be performed on the snowboard, conversion to use on a snowboard provides an interesting conversion for use of the apparatus in the winter.

Another possible arrangement for securing vehicle 20 to a device adapted for sliding across the ground or a slippery surface is shown in FIG. 21. In such arrangement, rather than placing the vehicle 20 in a container or platform holder 132 as shown in FIGS. 19 and 20, wheels 32, 34, and 36 are mounted in arcuate slotted rails 152, 154, and 156, respectively secured to snowboard 150. Straps 158 are then secured around the wheels to hold vehicle 20 to runner or snowboard 150. Various other arrangements which would be evident to one skilled in the art may be substituted for the strap arrangement shown in FIG. 21. For example, means for mounting runners directly to the wheel axles may be provided, or the wheels may be secured between opposed gripping members or by latches extending between the tire spokes or wheel frame. Individual runners may also be connected to each wheel rather than using a single large runner. Ultimately, the manner in which the ground contacting members of the vehicle 20 are held to a runner or sled will depend upon the type and arrangement of such members, and different arrangements may be provided without straying from the intended nature and scope of the invention.

FIG. 22 illustrates another alternative embodiment of the vehicle 20 of the invention wherein handlebar assembly 29 of the invention is screw threaded to platform 22 of vehicle 20. Female threaded aperture 160 in platform 22 may be provided directly in such platform or may be comprised of a threaded socket mounted to such platform for receiving thread 162 on the bottom end of handle 29. Also shown in FIG. 22 is a snowboard or runner 164 having a female threaded aperture 166 in which the threaded end 162 of the shaft portion of handlebar assembly 29 may be threaded and secured. Disclosed therefore is an arrangement wherein the handlebar assembly of the vehicle 20 of the invention may also be threadably connected to and used as a handlebar assembly for a snowboard, wherein daring maneuvers in addition to the wheelie maneuvers performed on vehicle 20 may be practiced and performed.

Figure 23:
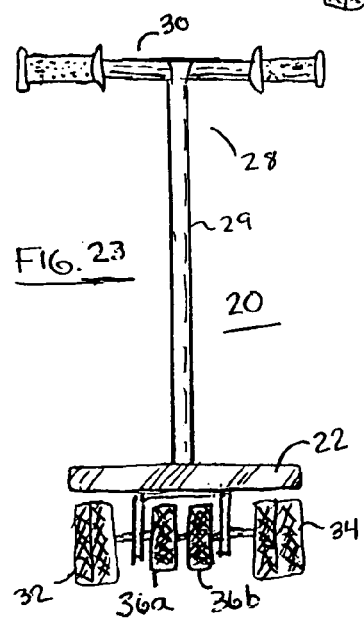
FIG. 23 is an end view of an amusement vehicle in accordance with the invention having a ganged arrangement of a wheelie wheel arrangement wherein two closely spaced smaller wheels on a single axle are essentially substituted for a single larger wheel.

FIG. 23 is an end elevation of an amusement vehicle in accordance with the invention similar to that shown in FIG. 2 but wherein the rear wheel 36 is formed in two sections 36a and 36b mounted upon a single axle between two struts. The two rear wheels 36a and 36b are sufficiently close together on the same axle 38 as to be effectively one wheel and are called ganged wheels. When wheelies are being performed the two wheels or tires act as one divided wheel.

Figure 24:
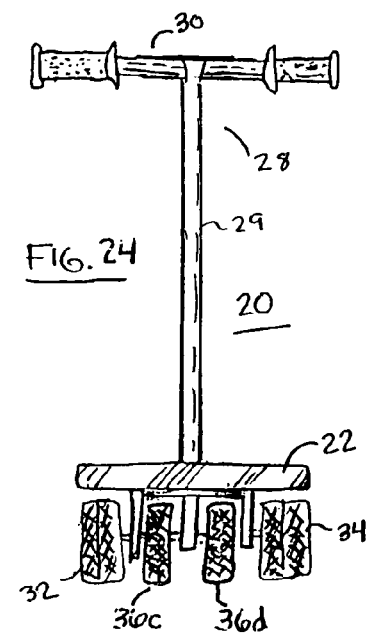
FIG. 24 is an end view of a ganged arrangement of a wheelie wheel arrangement similar to that shown in FIG. 23 but wherein two closely spaced smaller wheels on two separate but closely spaced axles are essentially substituted for a single larger wheel.

FIG. 24 is an end elevation similar to FIG. 23 in which the two ganged rear wheels 36c and 36d are mounted upon two separate axles extending from opposite sides of or through a single central strut 42a. In both cases the adjacent double or ganged wheels act as a single wheel.

As will be evident from the forgoing description and explanation together with the appended drawings there is provided in accordance with the present invention a short wheel-base recreational vehicle or platform particularly designed to perform wheelies and the like tricks or stunts which will demonstrate the proficiency of the one performing to bystanders and provide sustained interest to the user because of the skill necessary to effectively perform yet which is reasonably safe and easy to operate because of its relatively small size and lightweight. As disclosed, the wheelie vehicle of the invention can also be used with various auxiliary equipment for alternative purposes lending additional flexibility and usefulness to the equipment of the invention.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

The invention claimed is:

1. A short wheelbase amusement vehicle designed for performing wheelie maneuvers comprising:
   (a) a signal support platform for supporting a rider in upright position,
   (b) a single handlebar assembly mounted upon and extending upwardly from the support platform,
   (c) three ground contacting wheel members positioned within the perimeter and attached to the bottom of the support platform, with one of the three ground contacting wheel members being mounted centrally behind the other two wheel members in a triangular configuration; the two wheel members constituting front wheels and the one wheel member constituting a rear wheel,
   (d) the support platform being statically stable on the at least three ground contacting wheels in normal riding mode,
   (e) the distance between the front wheel members and the rear wheel member constituting the short wheel base, and being sufficiently wide to accommodate a rider's two feet in a side by side position,
   (g) the handle being centrally mounted within the confines of the wheel base and substantially equidistant from the sides of the platform support and securely attached to such platform support,
   (h) the platform extending beyond at least the rear wheels for a distance sufficient to prevent contact with the ground of the feet of a rider supported on the platform in a wheelie position, and
   (i) the handle being of sufficient height to be easily grasped by a rider in an erect position upon the platform and having leverage with respect to the wheel base and its position on the platform relative to the position of a rider's feet on the platform to easily tip the platform into a wheelie attitude on the rear wheel.

2. The amusement vehicle in accordance with claim 1 wherein the single handle extends upwardly from the structural support base inside the confines of an imaginary triangle having its apices directly over the center of the three wheels.

3. The amusement vehicle in accordance with claim 1 wherein the handle has two hand graspable means extending from it adjacent the top.

4. The amusement vehicle in accordance with claim 1 wherein the wheel base of the vehicle is restricted in length.

5. The amusement vehicle in accordance with claim 4 wherein the wheel base of the vehicle is from one to two and a half feet in length.

6. The amusement vehicle in accordance with claim 5 wherein the wheel base is from one and a quarter to one and three quarters feet.

7. The amusement vehicle of claim 5 wherein the handlebar assembly is adjustably mounted for height adjustment.

8. The amusement vehicle of claim 5 wherein the handlebar is attached to the support platform in a manner to allow forward and back movement.

9. The amusement vehicle of claim 7 wherein a wind catching member in the form of a sail is attached to the handle.

10. The amusement vehicle of claim 9 wherein there are at least two sail members attached to the handle.

11. The amusement vehicle of claim 8 wherein the handle is mounted for universal adjustment both forwardly and backwardly and laterally.

* * * * *